(12) United States Patent
Cochard et al.

(10) Patent No.: US 11,548,809 B2
(45) Date of Patent: Jan. 10, 2023

(54) METHOD OF MANUFACTURING A LITHIUM ALUMINOSILICATE GLASS PRODUCT FOR A GLASS-CERAMIC PRODUCT

(71) Applicant: EUROKERA S.N.C., Chateau Thierry (FR)

(72) Inventors: Jean-Patrick Cochard, Antony (FR); Simonpietro Di Pierro, Ormoy-Villers (FR); Emmanuel Lecomte, Nesles la Montagne (FR)

(73) Assignee: EUROKERA S.N.C., Chateau Thierry (FR)

( * ) Notice: Subject to any disclaimer, the term of this patent is extended or adjusted under 35 U.S.C. 154(b) by 144 days.

(21) Appl. No.: 16/614,153

(22) PCT Filed: May 16, 2018

(86) PCT No.: PCT/FR2018/051180
§ 371 (c)(1),
(2) Date: Nov. 15, 2019

(87) PCT Pub. No.: WO2018/211216
PCT Pub. Date: Nov. 22, 2018

(65) Prior Publication Data
US 2020/0148584 A1 May 14, 2020

(30) Foreign Application Priority Data
May 18, 2017 (FR) ...................... 1754385

(51) Int. Cl.
*C03C 10/00* (2006.01)
*C03C 1/00* (2006.01)

(52) U.S. Cl.
CPC .......... *C03C 10/0027* (2013.01); *C03C 1/004* (2013.01); *C03C 2203/10* (2013.01)

(58) Field of Classification Search
CPC . C03C 10/0027; C03C 1/004; C03C 2203/10; C03C 3/085
See application file for complete search history.

(56) References Cited

U.S. PATENT DOCUMENTS

| 4,192,688 | A | 3/1980 | Babcock et al. |
| 5,028,567 | A * | 7/1991 | Gotoh ................. C03C 10/0054 501/59 |
| 6,698,244 | B1 | 3/2004 | Römer et al. |
| 7,456,121 | B2 | 11/2008 | Comte |
| 2011/0026231 | A1 * | 2/2011 | Scordino .............. H05K 7/1417 361/752 |
| 2014/0238971 | A1 * | 8/2014 | Comte .................... C03C 3/087 501/27 |
| 2015/0239772 | A1 * | 8/2015 | Baker ................... C03C 21/002 428/410 |
| 2017/0260086 | A1 * | 9/2017 | Plevacova ........... C03C 10/0027 |

FOREIGN PATENT DOCUMENTS

| EP | 1 899 276 B1 | 3/2008 | |
| EP | 2 226 303 A2 | 9/2010 | |
| FR | 3 025 793 A1 | 3/2016 | |
| FR | 3025793 A1 * | 3/2016 | ......... C03C 10/0027 |
| JP | 4120897 B2 | 7/2008 | |
| WO | WO 2007/003566 A1 | 1/2007 | |
| WO | WO 2007/065910 A1 | 6/2007 | |

OTHER PUBLICATIONS

International Search Report as issued in International Patent Application No. PCT/FR2018/051180, dated Aug. 16, 2018.
Dakota Minerals: "Project Update—Sepeda Lithium Project, Portugal—For Immediate Release," Nov. 2016, XP055416301, Retrieved from the Internet: URL: http://www.dakotaminerals.com.au/asxannouncements/106/download-file?path=1616844.pdf, 17 pages.

* cited by examiner

*Primary Examiner* — Noah S Wiese
(74) *Attorney, Agent, or Firm* — Pillsbury Winthrop Shaw Pittman LLP

(57) ABSTRACT

A method of manufacturing a lithium aluminosilicate glass product suitable for making a glass-ceramic product, includes melting a vitrifiable mixture of raw materials, which are free from arsenic oxides and antimony oxides, apart from unavoidable traces, refining the molten material, cooling the molten material so as to form a glass, forming of the glass, wherein the vitrifiable mixture of raw materials includes petalite having a fraction by weight of total iron, expressed as $Fe_2O_3$, less than or equal to 200 ppm.

19 Claims, No Drawings

METHOD OF MANUFACTURING A LITHIUM ALUMINOSILICATE GLASS PRODUCT FOR A GLASS-CERAMIC PRODUCT

CROSS-REFERENCE TO RELATED APPLICATIONS

This application is the U.S. National Stage of PCT/FR2018/051180, filed May 16, 2018, which in turn claims priority to French patent application number 1754385 filed Mar. 18, 2017. The content of these applications are incorporated herein by reference in their entireties.

The present invention relates to a method of manufacturing a lithium aluminosilicate glass product suitable for making a glass-ceramic product. Said method allows better fusibility and better refining of the mixture of raw materials.

A glass ceramic is a composite material comprising an amorphous phase in which crystalline phases or crystals are dispersed. It is generally obtained by heat treatment of glass, so-called "green glass", for controlled crystallization of the crystals in its bulk. This treatment by which a glass is partially crystallized is called "ceramizing treatment" or simply "ceramizing". The final physicochemical properties of the glass ceramic depend on the composition of the green glass and the ceramizing treatment.

Glass ceramics based on the $Al_2O_3$—$SiO_2$—$Li_2O$ system contain solid solution(s) of β-quartz and/or of β-spodumene as the principal crystalline phase(s). These glass ceramics are valued in many fields for their physicochemical properties, notably their coefficient of thermal expansion, and their aesthetic qualities. They are used notably in cooking equipment as hot plates, oven door glass, or as fireplace inserts.

The manufacture of glass-ceramic products based on the $Al_2O_3$—$SiO_2$—$Li_2O$ system generally comprises four successive steps:
 a. melting a vitrifiable mixture of raw materials,
 b. refining the molten material,
 c. cooling the molten material and forming the green glass that has formed, and
 d. ceramizing the green glass by a suitable heat treatment.

The quality of the glass-ceramic product depends on the quality of the green glass obtained after the steps of melting and refining. This green glass must notably be free from any defects that may degrade the physicochemical properties and aesthetic qualities of the glass-ceramic product after the ceramizing step. As a result, these two steps of melting and refining must be carried out carefully. The mixture of raw materials must also be formulated and the refining agents must be selected so as to minimize the number of defects generated. Furthermore, they must make it possible to meet the criteria defined by the European directives that aim to reduce emissions of greenhouse gases and energy consumption relating to processes for producing manufactured products (Decision No. 406/2009/EC of the European Parliament and Council) as well as to reduce the toxicity of their constituents (Regulation No. 1272/2008/EC of the European Parliament and Council).

The melting step is a step of heating a mixture of raw materials to a high temperature. This mixture comprises several compounds combined in established proportions such that the composition, expressed in oxide fractions by weight, corresponds to that of the glass that is to be produced. These compounds are most often oxides, carbonates, sulfates and nitrates. When heated to a temperature that may reach 1700° C., such a mixture is the site of a certain number of reactions, whose end product is a liquid having the composition of glass: dehydration of the raw materials, formation of silicates by solid-solid reactions, liquefaction of the carbonates, which then react with said silicates, decomposition of the compounds with release of gases ($CO_2$, $NO_x$, $O_2$, $SO_3$) in the form of bubbles, formation of a liquid and dissolution of the compounds still present in said liquid.

The lithium aluminosilicate green glasses may contain 55 to 75 wt % of $SiO_2$, 12 to 25 wt % of $Al_2O_3$, and 2 to 5 wt % of $Li_2O$. The natural raw materials by which these three oxides are usually supplied are respectively quartz (sand), alumina and lithium carbonate ($Li_2CO_3$). Alumina and quartz require relatively high temperatures for heating the mixture of raw materials, and therefore large amounts of fuel, on account of their high melting point (1670° C. (β-tridymite) or 1713° C. (β-cristobalite) for quartz, 2054° C. for alumina). Furthermore, their refractory nature makes them frequent sources of defects in the final glass, often in the form of undissolved particles. In addition to its high cost on account of the scarcity of natural deposits, lithium carbonate is an important source of carbon dioxide.

The refining step consists of promoting rising of the bubbles to the surface of the liquid and evacuating the gases that the latter contains. Owing to the movement of the bubbles, it also allows mixing of the liquid in order to homogenize its composition and promote dissolution of the residual compounds that have not melted. For this, a compound, called a "fining agent" or "refining agent", is added to the mixture of raw materials. It has the property of releasing a gas or of causing it to be released, which, by entering the bubbles so that their size increases, promotes rising of them to the surface of the liquid. The fining agents traditionally used for lithium aluminosilicate green glasses are arsenic oxides and antimony oxides. However, owing to their toxicity, several methods have been or are being developed for replacing them.

Most of these methods are based on the use of tin oxide. Now, this oxide has two drawbacks. It only releases oxygen in sufficient quantity at high temperatures (>1600° C.) and it has low solubility in glasses based on the $Al_2O_3$—$SiO_2$—$Li_2O$ system (<~0.6 wt %). This low solubility is unable to compensate the insufficiency of oxygen that would be released at temperatures below 1600° C. Consequently, tin oxide is often used in combination with other compounds in order to promote release of oxygen. These compounds may be, for example, halides such as chlorides (JP4120897 B2, U.S. Pat. No. 6,698,244 B1), fluorides (EP1899276 B1, U.S. Pat. No. 6,698,244 B1) or bromides (U.S. Pat. No. 7,456,121 B2), transition metal oxides such as oxides of cerium and/or of manganese (WO2007065910 A1, U.S. Pat. No. 6,698,244 B1), or sulfates (U.S. Pat. No. 6,698,244 B1) or nitrates. However, their use does not always give satisfactory results. They might be volatile, toxic and corrosive for the refractory elements of the furnace, they might not generate sufficient bubbles and/or might be responsible for undesirable coloration of the green glass or of the glass ceramic obtained after the ceramizing treatment.

The prior art teaches that all or part of the raw materials usually employed for making green glass based on the $Al_2O_3$—$SiO_2$—$Li_2O$ system system, i.e. lithium carbonate, quartz and alumina, may be replaced successfully with lithium aluminosilicates, such as petalite (feldspar with the theoretical formula $LiAlSi_4O_{10}$) or spodumene (pyroxene with the theoretical formula $LiAl(SiO_3)_2$)—(Haigh & Kingsnortk, The Lithium Minerals Industry, Glass, 1989; Yuan et al. Preparation of spodumene-derived low expansion coefficient glass ceramic in the system $Li_2O—Al_2O_3—SiO_2$, Journal of Wuhan University of Technology, 12(4): 18-24, 1997; EP2226303).

By using these two raw materials it is notably possible to decrease carbon dioxide emissions and improve the "fusibility" of the mixture of raw materials. This improvement in fusibility is manifested in particular in a decrease in the temperatures for heating the mixture of raw materials owing to the lower melting points of spodumene and petalite (~1350° C. and ~1423° C. for petalite and spodumene, respectively), decrease in the number of undissolved particles, and quicker homogenization of the composition of the liquid. Examples of using petalite and spodumene with tin oxide as refining agent are described in document EP2226303 B1.

In the technical field, the terms "spodumene" and "petalites" are often used in general to denote all of the minerals of the class of spodumenes and petalites, respectively. They also often denote, by extension, the rocks containing them predominantly. These rocks, which are derived from natural, inhomogeneous deposits formed in different geological conditions, undergo several transformations and reactions in order to extract the actual minerals petalite and spodumene from them. These minerals are then used in the form of raw materials in the mixtures for making the glass and glass-ceramic products. It is therefore obvious that, depending on their origin, these raw materials are not perfectly stoichiometric, they may have different structural features and may contain other elements in small amounts or as traces. That is why they are generally described and classified according to the contents of the various oxides and trace minerals that they contain. The term "grade" is commonly used for description and classification.

In the prior art, the grades of the materials are not generally given in detail. The terms "spodumene" and "petalites" are used generically. In particular, document EP2226303 B1 mentions a petalite and two spodumenes, the grades of which are not described. They are used for making glasses based on the system $SiO_2—Al_2O_3—Li_2O$ with tin oxide as refining agent. However, the temperature at which the refining step is carried out is still high (≥1600° C.) and the number of undissolved particles, although lower than for a mixture of usual raw materials, is still high (10 to 50%).

Now, in the context of research into the fusibility and the refining of molten materials for making green glasses in the system $SiO_2—Al_2O_3—Li_2O$, it was found that, other things being equal, the fusibility and the refining of a mixture of raw materials incorporating petalite varies depending on the deposit from which it is extracted. In particular, certain grades of petalite are favorable for melting and refining.

The present invention therefore relates to a method of manufacturing a lithium aluminosilicate glass product giving better fusibility and better refining of the mixture of raw materials. The method comprises the following steps:
 a. melting a vitrifiable mixture of raw materials which, apart from unavoidable traces, are free from arsenic oxides and antimony oxides,
 b. refining the molten material,
 c. cooling said molten material so as to form a glass,
 d. forming of said glass,
said method being characterized in that said vitrifiable mixture of raw materials comprises petalite having a fraction by weight of total iron, expressed as $Fe_2O_3$, less than or equal to 200 ppm.

In the sense of the invention, a vitrifiable mixture of raw materials which, apart from unavoidable traces, are free from arsenic oxides and antimony oxides, corresponds to a vitrifiable mixture of raw materials in which arsenic oxides and/or antimony oxides are not introduced deliberately. These arsenic oxides and/or antimony oxides may, however, be present naturally in the other raw materials, generally as traces, for example such as in a cullet serving as a carrier for the other elements of the vitrifiable mixture. Preferably, the sum of the fractions by weight of the arsenic and antimony oxides in the composition of the glass obtained from the vitrifiable mixture of raw materials is less than or equal to 1000 ppm.

The term "petalite" denotes any raw material, crude or treated, that may be used for forming said vitrifiable mixture of raw materials, and in which the petalite mineral proper is predominant, i.e. whose fraction by weight is greater than or equal to 50%.

The petalite mineral has the theoretical chemical formula $LiAlSi_4O_{10}$. However, quite commonly the natural petalite mineral cannot be expressed perfectly by this theoretical formula. Especially if it is of natural origin, the contents of elements Li, Al, Si and O forming said mineral may vary slightly. It may, moreover, contain other elements in trace amounts. Consequently, generally a mineral is to be regarded as a petalite mineral if the relative contents of said elements Li, Al, Si and O are comparable to those expressed in the theoretical formula $LiAlSi_4O_{10}$ and if its crystallographic properties satisfy those defined in group 72.06.01.01 of the Dana classification, i.e. its crystal system is monoclinic, its space group is P2/a and its point symmetry group is 2/m according to the Hermann-Mauguin notation. For example, the natural mineral $Li_{0.92}Al_{0.99}Si_{3.99}O_{10}$ is a petalite mineral (Anthony J W, Bideaux R. A., Bladh K. W., and Nichols M. C. (1990) Handbook of Mineralogy, Mineral Data Publishing, USA). The theoretical formula $LiAlSi_4O_{10}$ or the expression "petalite mineral" therefore denotes the petalite mineral indifferently according to said definition.

The fraction by weight of said petalite in said vitrifiable mixture of raw materials is advantageously at least 50%, notably at least 70%, in particular at least 80%, preferably at least 90%. The more this fraction by weight is increased, the more the fusibility and the refining of the mixture of raw materials will be improved. This will be manifested notably in a decrease in the number of undissolved particles, and quicker homogenization of the composition of the liquid.

Furthermore, said petalite may comprise a fraction by weight of the petalite mineral greater than or equal to 90%. The more the petalite raw material is enriched in petalite mineral, the less it will be a potential source of undesirable elements and of mineral phases whose excessively high melting point might not allow complete fusion at the temperature at which the method of the invention will be carried out. The fusibility and the refining of the mixture of raw materials will thus be improved.

Depending on the petalite content of the vitrifiable mixture of raw materials, the refining temperature in step b of the method of the invention may be at most 1700° C., in particular at most 1600° C., preferably at most 1550° C. The decrease in refining temperature makes it possible to reduce the energy consumption of the method of the invention, and therefore the amount of fuel required for generating this energy.

The fusibility and the refining of the vitrifiable mixture of raw materials are improved as the fraction by weight of total iron, expressed as $Fe_2O_3$, of the petalite is reduced. It may notably be less than or equal to 200 ppm, notably less than or equal to 100 ppm, and preferably less than or equal to 50 ppm.

It may be greater than or equal to 10 ppm, notably greater than or equal to 20 ppm. The fraction by weight of total iron, expressed as $Fe_2O_3$, of the vitrifiable mixture of raw materials will advantageously be between 4 ppm and 200 ppm.

Still with the aim of improving the refining of the vitrifiable mixture of raw materials, said mixture may comprise one or more fining agents selected from $SnO_2$, $CeO_2$, $MnO_2$, fluorides and chlorides. Their contents may be adapted according to the amount of petalite that said vitrifiable mixture comprises and according to the iron content, expressed as $Fe_2O_3$, of said petalite. When the fining agent is tin dioxide, $SnO_2$, its fraction by weight in the final glass may be less than 0.5%, in particular between 0.1% and 0.4%. For the same reasons, the mixture of raw materials may comprise nitrates of alkali metals or of alkaline earths whose fraction by weight in the vitrifiable mixture will be at most 4%.

Said petalite may also contain a certain amount of fluorine naturally. The fraction by weight of fluorine contained in said petalite will then be greater than or equal to 0.10%. It was found that when petalite contains fluorine, the refining of the vitrifiable mixture of raw materials is improved relative to a vitrifiable mixture in which the petalite did not contain fluorine and in which said fluorine was supplied by another raw material.

In order to manufacture a glass by the method of the invention, the proportions of the various raw materials comprised in the vitrifiable mixture will have to be established such that the composition, expressed in oxide fractions by weight, corresponds to that of the glass that is required to be produced. The glass obtained preferably comprises the following constituents in the ranges defined below expressed in fractions by weight.

| | |
|---|---|
| $SiO_2$ | 52-75%, |
| $Al_2O_3$ | 12-27%, |
| $Li_2O$ | 2-6%, |
| $Na_2O$ | 0-3%, |
| $K_2O$ | 0-3%, |
| CaO | 0-5%, |
| MgO | 0-5%, |
| SrO | 0-5%, |
| BaO | 0-5%, |
| ZnO | 0-5%, |
| $TiO_2$ | 1-6%, |
| $ZrO_2$ | 0-3%, |
| $P_2O_5$ | 0-8%. |

The proportion of each of the oxides must be adjusted as a function of the physicochemical properties required for the green glass and the glass-ceramic product that may be produced starting from the latter. In order to manufacture said glass-ceramic product, the method of the invention may further comprise a ceramizing step.

The ceramizing step to which a glass having a composition as indicated above may be submitted is required for forming the solid solution(s) of β-quartz and/or of β-spodumene as principal crystalline phase(s). This step comprises several successive heat treatments at different temperatures and for different times. These treatments are generally carried out:

between 650 and 850° C., for 15 minutes to 4 hours, for nucleation of said crystalline phases, and between 860 and 950° C., for 10 minutes to 2 hours, for growth of said crystalline phases.

The final physicochemical and optical properties of the glass-ceramic product will depend on the composition of the green glass and the parameters of the ceramizing step. This composition and these parameters will therefore have to be adapted according to the desired applications of the glass-ceramic product.

The method of the invention may also be employed advantageously in the manufacture of colored glass-ceramic products. These products may then be colored using one or more oxides selected from CoO, $Cr_2O_3$, $MnO_2$, NiO, $V_2O_5$, and $CeO_2$.

The glass-ceramic products obtainable by the method of the invention, when it further comprises a ceramizing step, may be used in cooking equipment, such as hot plates, oven door glass, or as fireplace inserts or glazing for fire protection.

EXAMPLE 1

The advantages of the method of the invention are illustrated perfectly by a first nonlimiting example described below, comparing three green glasses with the same nominal chemical composition, one of which is manufactured according to an embodiment of the method of the invention and the other two according to two methods of the prior art.

The first method of the prior art is a reference method in which the oxides $Li_2O$, $SiO_2$ and $Al_2O_3$ are supplied in the mixture of raw materials in the form of lithium carbonate, silica and alumina, respectively. In said embodiment of the method of the invention, these three oxides are supplied in the form of alumina and petalite Q1. In the second method of the prior art, they are supplied in the form of alumina and petalite Q2. Table 1 below indicates the weights of raw materials making up the three vitrifiable mixtures, M1, M2 and M3 according to each of these methods, respectively. Each mixture contains tin oxide as fining agent in the same proportions. The nominal chemical composition of the green glass obtainable from these three vitrifiable mixtures is given in Table 2 below.

TABLE 1

Weights of the raw materials (in grams) of the examples of vitrifiable mixtures of the method of the invention (M2) and of the methods of the prior art (M1 and M3).

| | M1 | M2 | M3 |
|---|---|---|---|
| Silica | 631.10 | — | — |
| Alumina | 223.63 | 90.49 | 85.50 |
| Lithium carbonate | 95.04 | 7.2 | 5.00 |
| Barium nitrate | 33.17 | 33.17 | 33.20 |
| Titanium dioxide | 17.48 | 17.63 | 17.60 |
| Zircon | 32.28 | 32.28 | 32.30 |
| Zinc oxide | 15.47 | 15.47 | 15.50 |
| Tin dioxide | 3.37 | 3.37 | 3.40 |
| Sodium nitrate | 14.90 | 6.50 | 7.80 |
| Magnesium oxide | 5.13 | 4.70 | 4.80 |
| Potassium carbonate | 3.72 | — | 21.50 |
| Calcium carbonate | 23.47 | 23.47 | — |
| Petalite Q1 | — | 800.40 | — |
| Petalite Q2 | — | — | 811.00 |
| Total | 1098.76 | 1034.68 | 1037.60 |

TABLE 2

Nominal chemical composition, expressed as fraction by weight of oxides, of the green glass obtainable from the vitrifiable mixtures M1, M2 and M3 in Table 1.

| $SiO_2$ | $Al_2O_3$ | MgO | $Na_2O$ | $K_2O$ | BaO | $TiO_2$ | ZnO | $Li_2O$ | $ZrO_2$ | SnO |
|---|---|---|---|---|---|---|---|---|---|---|
| 67.80 | 20.11 | 1.24 | 0.15 | 0.19 | 0.80 | 2.61 | 1.61 | 3.47 | 1.71 | 0.30 |

The chemical compositions of petalites Q1 and Q2, expressed in oxide fractions by weight, and the proportions of the mineral phases, expressed in fractions by weight, that these two petalites contain are given in Tables 3 and 4 below, respectively. The chemical compositions were obtained by chemical analysis by the wet method. The proportions of the mineral phases were calculated by quantifying, by the Rietvelt refinement method, the diffraction patterns obtained by X-ray diffraction.

TABLE 3

Chemical compositions, in oxide fractions by weight, of the two examples of petalites, Petalite Q1 and Petalite Q2. Petalite Q1 is used in the method of the invention, and Petalite Q2 in the method of the prior art.

|  | Petalite Q1 | Petalite Q2 |
|---|---|---|
| $Al_2O_3$ | 16.604 | 16.911 |
| $Fe_2O_3$ | 0.009 | 0.071 |
| $Li_2O$ | 4.238 | 4.435 |
| $SiO_2$ | 79.149 | 78.582 |

TABLE 4

Proportions of the mineral phases, expressed in fractions by weight, contained in two examples of petalites, Petalite Q1 and Petalite Q2. Petalite Q1 is used in the method of the invention, and Petalite Q2 in the method of the prior art. (Error: ±1%)

|  | Petalite Q1 | Petalite Q2 |
|---|---|---|
| Petalite mineral | 91.1 | 87.8 |
| Quartz | 3.8 | 5.4 |
| Albite | 2.6 | 3.6 |
| Microcline | 2.5 | — |
| Spodumene | — | 3.2 |

Petalite Q1 and petalite Q2 are very similar in terms of composition. The contents of quartz and of albite are comparable in the error bars (±1%). These two petalites therefore different essentially by the total amount of iron, expressed as $Fe_2O_3$: 0.009% (90 ppm) for petalite Q1 and 0.071% (710 ppm) for petalite Q2.

In order to compare the fusibility and the refining of the three vitrifiable mixtures in Table 1, they were submitted to a test of fusibility and refining according to the following protocol.

After being placed respectively in platinum crucibles, the mixtures were heated at 1550° C. or 1500° C. for 4 hours, and cooled in air with a holding stage at 750° C. for 2 h. Then the fused and then cooled materials corresponding to each vitrifiable mixture were extracted and cut out in the form of plates with a thickness of 4 mm. The two faces of each of the plates were polished mechanically. Six specimen polished plates, three for each temperature, were thus been obtained.

Fusibility and refining were evaluated by measuring the area fraction of defects (bubbles and undissolved particles) present in each of said plates. For this, optical micrographs of each of the six plates were acquired using a suitable light microscope. On the micrographs, in gray scale, the defects appear darker than the fused material, and they can thus be discriminated using a method of image analysis by thresholding. Their area fraction is then calculated by measuring the area covered by the defects on the micrographs transformed by said imaging technique and by referring this area to the total area. The results are presented in Table 5 below.

TABLE 5

Area fractions of defects (bubbles and undissolved particles) present in the plates of fused material obtained from the mixtures of raw materials M1, M2 and M3 in Table 1 after two tests of fusibility and refining carried out for 4 hours at 1550° C. and 1500° C., respectively.

|  | M1 | M2 | M3 |
|---|---|---|---|
| 1550° C.-4 h | 10.5% | 9.3% | 45.5% |
| 1500° C.-4 h | 24.5% | 30.2% | — |

Comparing the data in Table 5 for the vitrifiable mixtures M1 and M2 corresponding respectively to the reference method of the prior art in which lithium carbonate, alumina and silica are used, and to the method of the invention in which petalite Q1 is used, it can be seen that the proportions of defects are roughly comparable for the green glasses obtained at 1550° C., and that at 1500° C. the proportion of defects in the green glass obtained by the method of the invention is slightly higher. Relative to mixture M3 corresponding to a second method of the prior art in which petalite Q2 is used, this proportion is 2 to 5 times lower at 1500° C. As a result, these results clearly demonstrate that the method of the invention improves the fusibility and the refining of the vitrifiable mixture of raw materials for manufacturing a glass product, starting from which a glass-ceramic product can be obtained.

EXAMPLE 2

The advantages of the method of the invention are illustrated perfectly by a second nonlimiting example described below in which two green glasses with the same nominal chemical composition are compared, one of which is manufactured according to an embodiment of the method of the invention and the other according to a method of the prior art.

The method of the prior art is a reference method in which the oxides $Li_2O$, $SiO_2$ and $Al_2O_3$ are supplied in the mixture of raw materials in the form of alumina, silica and petalite Q2. In the embodiment of the method of the invention, these three oxides are supplied in the form of alumina and petalite Q3. Table 6 below gives the weights of raw materials making up the two vitrifiable mixtures M4 and M5 according to each of these two methods, respectively. The fraction by weight of petalite in each of the vitrifiable mixtures M4 and M5 is above 80%. Each mixture contains tin oxide as fining agent in the same proportions. The nominal chemical composition of the green glass obtainable from these two vitrifiable mixtures is given in Table 7 below.

TABLE 6

Weights of the raw materials (in grams) of the examples of vitrifiable mixtures of the method of the invention (M5) and of the method of the prior art (M4).

| | M4 | M5 |
|---|---|---|
| Silica | 17.85 | — |
| Alumina | 80.63 | 78.01 |
| Titanium dioxide | 22.22 | 22.22 |
| Zircon | 11.75 | 11.75 |
| Zinc oxide | 13.4 | 13.4 |
| Tin dioxide | 4.1 | 4.1 |
| Sodium nitrate | 1.25 | 7.5 |
| Potassium carbonate | 11 | 12.1 |
| Calcium carbonate | 7 | 9 |
| Petalite Q2 | 845 | — |
| Petalite Q3 | — | 860.4 |
| Total | 1014.2 | 1018.48 |

TABLE 7

Nominal chemical composition, expressed as fraction by weight of oxides, of the green glass obtainable from the vitrifiable mixtures M4 and M5 in Table 6.

| $SiO_2$ | $Al_2O_3$ | CaO | $Na_2O$ | $K_2O$ | $TiO_2$ | ZnO | $Li_2O$ | $ZrO_2$ | $SnO_2$ |
|---|---|---|---|---|---|---|---|---|---|
| 67.7 | 22.0 | 0.5 | 0.4 | 1.0 | 2.2 | 1.3 | 3.7 | 0.8 | 0.4 |

The chemical compositions of petalites Q2 and Q3, expressed in oxide fractions by weight, are shown in Table 8 below. The chemical compositions were obtained by chemical analysis by the wet method.

TABLE 8

Chemical compositions, in oxide fractions by weight, of the two example petalites, Petalite Q2 and Petalite Q3. Petalite Q3 is used in the method of the invention, and Petalite Q2 in the method of the prior art.

| | Petalite Q2 | Petalite Q3 |
|---|---|---|
| $Al_2O_3$ | 16.911 | 16.817 |
| $Fe_2O_3$ | 0.071 | 0.007 |
| $Li_2O$ | 4.435 | 4.330 |
| $SiO_2$ | 78.582 | 78.846 |

Petalite Q2 and petalite Q3 are very similar in terms of composition, and different essentially by the total amount of iron, expressed as $Fe_2O_3$: 0.007% (70 ppm) for petalite Q3 and 0.071% (710 ppm) for petalite Q2.

In order to compare the refining of the two vitrifiable mixtures in Table 6, they were submitted to a test of production and refining according to the following protocol.

After being placed respectively in platinum crucibles, the mixtures were heated at temperatures between 1500° C. and 1600° C. for a time between 2 hours and 4 hours, and cooled in air with a holding stage at 710° C. for 1 hour. Then the fused and then cooled materials corresponding to each vitrifiable mixture were extracted and cut out in the form of a cylinder with a diameter of 2 cm and a height of about 2 cm. Six cylindrical specimens, one for each mixture and each production cycle, were thus obtained.

Refining was evaluated by measuring the volume fraction of bubbles and the size distribution of the bubbles present in each cylinder. For this, each cylinder was analyzed by X-ray tomography using an EasyTom 150 tomograph. The power of the X-ray generator was fixed at 8 W. The acquisition rate was fixed at 3 images per second. The lateral resolution, also called voxel size, was fixed at 13 μm. The volume was reconstructed from the radiographic sections using the Avizo software from the company FEI/Thermo Scientific. The volume fraction of bubbles and the size distribution of the bubbles were calculated using the same Avizo software by a thresholding method.

The values of the volume fractions of bubbles present in each cylinder are presented in Table 9 below. The size distributions of the bubbles present in each cylinder are presented in Table 10 below.

TABLE 9

Volume fractions of bubbles present in the cylinders of fused material obtained from the mixtures of raw materials M4 and M5 in Table 6.

| | M4 | M5 |
|---|---|---|
| 1550° C.-2 h | 0.81 | 0.43 |
| 1550° C.-4 h | 0.26 | 0.15 |
| 1600° C.-2 h | 0.28 | 0.18 |

TABLE 10

Size distributions of the bubbles present in the cylinders of fused material obtained from the mixtures of raw materials M4 and M5 in Table 6. The distributions are expressed in relative proportions by volume in four ranges of bubble diameter.

| Diameter of the bubbles | | <100 μm | 100-200 μm | 200-300 μm | >300 μm |
|---|---|---|---|---|---|
| 1550° C.-2 h | M4 | 50.7% | 32.3% | 12.4% | 4.6% |
| | M5 | 47.8% | 32.9% | 12.4% | 6.8% |
| 1550° C.-4 h | M4 | 71.6% | 21.6% | 5.8% | 1.1% |
| | M5 | 49.3% | 38.0% | 10.8% | 1.9% |
| 1600° C.-2 h | M4 | 93.9% | 5.0% | 0.9% | 0.2% |
| | M5 | 81.0% | 14.2% | 4.0% | 0.8% |

Comparing the data in Table 9 for the vitrifiable mixtures M4 and M5, it can clearly be seen that the volume fraction of bubbles is lower in the cylinders obtained with the method of the invention. Moreover, the data in Table 10 show that the proportions of bubbles of larger sizes are higher in the cylinders obtained using the method of the invention. A higher proportion of large bubbles corresponds to a more advanced state of refining. The method of the invention therefore gives quicker refining of a vitrifiable mixture of raw materials for manufacturing a glass product, starting from which a glass-ceramic product can be obtained.

EXAMPLE 3

The advantages of the method of the invention are illustrated perfectly by a third nonlimiting example described below in which two green glasses with the same nominal chemical composition are compared, one of which is manufactured according to an embodiment of the method of the invention and the other according to a method of the prior art.

The method of the prior art is a reference method in which the oxides $Li_2O$, $SiO_2$ and $Al_2O_3$ are supplied in the mixture of raw materials in the form of alumina, silica and petalite Q2. In the embodiment of the method of the invention, these three oxides are supplied in the form of alumina, silica and petalite Q1. Table 11 below indicates the weights of raw materials making up the two vitrifiable mixtures M6 and M7, according to each of these two methods, respectively. The fraction by weight of petalite in each of the vitrifiable mixtures M6 and M7 is 50%. Each mixture contains tin oxide as fining agent in the same proportions. The nominal chemical composition of the green glass obtainable from these two vitrifiable mixtures is given in Table 12 below.

TABLE 11

Weights of the raw materials (in grams) of the examples of vitrifiable mixtures of the method of the invention (M7) and of the method of the prior art (M6).

|  | M6 | M7 |
|---|---|---|
| Silica | 235.6 | 233.7 |
| Alumina | 142.55 | 144.3 |
| Lithium carbonate | 47.7 | 50.7 |
| Barium nitrate | 20.23 | 20.23 |
| Titanium dioxide | 27.9 | 27.9 |
| Zircon | 26.85 | 26.85 |
| Zinc oxide | 1.95 | 1.95 |
| Tin dioxide | 3.06 | 3.1 |
| Magnesium oxide | 3 | 3 |
| Potassium carbonate | 8.75 | 4.69 |
| Calcium carbonate | 6.5 | 7.5 |
| Petalite Q1 | — | 524 |
| Petalite Q2 | 525 | — |
| Total | 1049.1 | 1047.9 |

TABLE 12

Nominal chemical composition, expressed as fraction by weight of oxides, of the green glass obtainable from the vitrifiable mixtures M6 and M7 in Table 11.

| $SiO_2$ | $Al_2O_3$ | CaO | MgO | $Li_2O$ | $Na_2O$ | $K_2O$ | $TiO_2$ | $ZrO_2$ | BaO | ZnO | $SnO_2$ |
|---|---|---|---|---|---|---|---|---|---|---|---|
| 65.03 | 22.72 | 0.43 | 0.31 | 4.18 | 0.26 | 0.75 | 2.77 | 1.83 | 1.22 | 0.19 | 0.3 |

The chemical compositions of petalites Q1 and Q2, expressed in oxide fractions by weight, are identical to those of example 1 given in Table 3.

In order to compare the refining of the two vitrifiable mixtures in Table 11, they were submitted to a production and fining test according to the following protocol.

After being placed respectively in platinum crucibles, the mixtures were heated at temperatures between 1500° C. and 1650° C. for a time between 2 hours and 4 hours, and cooled in air with a holding stage at 710° C. for 1 hour. Then the fused and then cooled materials corresponding to each vitrifiable mixture were extracted and cut out in the form of a cylinder with a diameter of 2 cm and a height of about 2 cm. Six cylindrical specimens, one for each mixture and each production cycle, were thus been obtained.

Refining was evaluated by measuring the volume fraction of bubbles present in each cylinder. For this, each cylinder was analyzed by X-ray tomography using an EasyTom 150 tomograph. The power of the X-ray generator was fixed at 8 W. The acquisition rate was fixed at 3 images per second. The lateral resolution, also called voxel size, was fixed at 13 μm. The volume was reconstructed from the radiographic sections using the Avizo software from the company FEI/Thermo Scientific. The volume fraction of bubbles was calculated using the same Avizo software by a thresholding method.

The values of the volume fractions of bubbles present in each cylinder are presented in Table 13 below.

TABLE 13

Volume fractions of bubbles present in the cylinders of fused material obtained from the mixtures of raw materials M4 and M5 in Table 11.

|  | M6 | M7 |
|---|---|---|
| 1550° C.-4 h | 0.17 | 0.12 |
| 1600° C.-2 h | 0.43 | 0.11 |
| 1650° C.-2 h | 0.03 | 0.02 |

Comparing the data in Table 13 for the vitrifiable mixtures M6 and M7, it can be seen that the volume fraction of bubbles is lower in the cylinders obtained with the method of the invention. These results demonstrate that the method of the invention improves the refining of the vitrifiable mixture of raw materials for manufacturing a glass product, starting from which a glass-ceramic product is obtainable.

The invention claimed is:

1. A method of manufacturing a lithium aluminosilicate glass product comprising:
   a. melting a vitrifiable mixture of raw materials to form a molten material,
   b. refining the molten material,
   c. cooling said molten material so as to form a glass,
   d. forming of said glass,
   wherein said vitrifiable mixture of raw materials comprises petalite having a fraction by weight of total iron, expressed as $Fe_2O_3$, less than or equal to 200 ppm, and
   wherein the fraction by weight of said petalite in said vitrifiable mixture of raw materials is at least 50%.

2. The method as claimed in claim 1, wherein the mixture of vitrifiable materials is free from arsenic oxides and antimony oxides, apart from unavoidable traces.

3. The method as claimed in claim 1, wherein a refining temperature in step b is at most 1700° C.

4. The method as claimed in claim 1, wherein said petalite comprises petalite mineral in a fraction by weight greater than or equal to 90%.

5. The method as claimed in claim 1, wherein said petalite has a fraction by weight of total iron, expressed as $Fe_2O_3$, less than or equal to 100 ppm.

6. The method as claimed in claim 1, wherein said vitrifiable mixture of raw materials comprises one or more fining agents selected from $SnO_2$, $CeO_2$, $MnO_2$, fluorides and chlorides.

7. The method as claimed in claim 6, wherein said fining agent is $SnO_2$, and the fraction by weight of said $SnO_2$ in the final glass is less than 0.5%.

8. The method as claimed in claim 1, wherein the fraction by weight of total iron, expressed as $Fe_2O_3$, in the vitrifiable mixture of raw materials is between 4 ppm and 200 ppm.

9. The method as claimed in claim 1, wherein the glass obtained comprises the following constituents in the ranges defined below expressed in fractions by weight:

| | |
|---|---|
| $SiO_2$ | 52-75% |
| $Al_2O_3$ | 12-27% |
| $Li_2O$ | 2-5.5% |
| $Na_2O$ | 0-3%, |
| $K_2O$ | 0-3%, |
| CaO | 0-5%, |
| MgO | 0-5%, |
| SrO | 0-5%, |
| BaO | 0-5%, |
| ZnO | 0-5%, |
| $TiO_2$ | 1-6%, |
| $ZrO_2$ | 0-3%, |
| $P_2O_5$ | 0-8%. |

10. A glass product obtainable by the method as claimed in claim 1.

11. The method as claimed in claim 1, further comprising a ceramizing step e).

12. A glass-ceramic product obtainable by the method as claimed in claim 11.

13. Cooking equipment, fireplace insert, glazing for fire protection comprising a glass-ceramic product as claimed in claim 12.

14. The method as claimed in claim 3, wherein a refining temperature in step b is at most 1550° C.

15. The method as claimed in claim 1, wherein the fraction by weight of said petalite in said vitrifiable mixture of raw materials is at least 80%.

16. The method as claimed in claim 1, wherein said petalite has a fraction by weight of total iron, expressed as $Fe_2O_3$, less than or equal to 50 ppm.

17. The method as claimed in claim 7, wherein said fining agent is $SnO_2$, and the fraction by weight of said $SnO_2$ in the final glass is between 0.4% and 0.1%.

18. A method of manufacturing a lithium aluminosilicate glass product comprising:
   a. melting a vitrifiable mixture of raw materials to form a molten material,
   b. refining the molten material,
   c. cooling said molten material so as to form a glass,
   d. forming of said glass,
wherein said vitrifiable mixture of raw materials comprises petalite having a fraction by weight of total iron, expressed as $Fe_2O3$, less than or equal to 200 ppm, and
wherein said petalite has a fraction by weight of fluorine greater than or equal to 0.10%.

19. A method of manufacturing a lithium aluminosilicate glass product comprising:
   a. melting a vitrifiable mixture of raw materials to form a molten material,
   b. refining the molten material,
   c. cooling said molten material so as to form a glass,
   d. forming of said glass,
wherein said vitrifiable mixture of raw materials comprises petalite having a fraction by weight of total iron, expressed as $Fe_2O_3$, less than or equal to 200 ppm, and
wherein the mixture of raw materials comprises nitrates of alkali metals or of alkaline earths, and wherein an amount of the nitrates of alkali metals or of alkaline earths is in a fraction by weight of greater than 0% and at most 4%.

* * * * *